US 9,240,928 B2

(12) United States Patent
Gerö et al.

(10) Patent No.: US 9,240,928 B2
(45) Date of Patent: Jan. 19, 2016

(54) DATA PLANE FOR RESILIENT NETWORK INTERCONNECT

(75) Inventors: Balázs Peter Gerö, Budapest (HU); János Farkas, Kecskemét (HU); Panagiotis Saltsidis, Stockholm (SE); Zhemin Ding, Stockholm (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 0 days.

(21) Appl. No.: 13/146,279

(22) PCT Filed: Jun. 20, 2011

(86) PCT No.: PCT/EP2011/003033
§ 371 (c)(1),
(2), (4) Date: Sep. 29, 2011

(87) PCT Pub. No.: WO2012/079655
PCT Pub. Date: Jun. 21, 2012

(65) Prior Publication Data
US 2013/0254327 A1 Sep. 26, 2013

Related U.S. Application Data

(60) Provisional application No. 61/422,992, filed on Dec. 14, 2010.

(51) Int. Cl.
*G06F 15/16* (2006.01)
*H04L 12/24* (2006.01)
(Continued)

(52) U.S. Cl.
CPC ............ *H04L 41/12* (2013.01); *H04L 12/4625* (2013.01); *H04L 12/4633* (2013.01); *H04L 12/4641* (2013.01); *H04L 45/04* (2013.01); *H04L 45/306* (2013.01); *H04L 2212/00* (2013.01)

(58) Field of Classification Search
CPC ............ H04L 12/4633; H04L 12/4641; H04L 12/4662; H04L 45/04; H04L 49/354; H04L 12/4658; H04L 12/4654; H04L 45/502; H04L 45/72; H04L 12/4645; H04L 2212/0025
USPC .................. 709/217–218; 370/389–390, 392
See application file for complete search history.

(56) References Cited

U.S. PATENT DOCUMENTS 7,787,480 B1 * 8/2010 Mehta et al. .................. 370/401
8,223,668 B2 * 7/2012 Allan et al. .................... 370/254
(Continued)

OTHER PUBLICATIONS

International Search Report and Written Opinion mailed Aug. 17, 2011 in PCT application PCT/EP2011/003033.
(Continued)

*Primary Examiner* — Jeffery Williams
*Assistant Examiner* — Christopher C Harris
(74) *Attorney, Agent, or Firm* — Nixon & Vanderhye P.C.

(57) ABSTRACT

A network interconnect node of an internal network may communicate with an external network interconnect node of an external network, other internal network interconnect node(s) and internal network node(s). The network interconnect node may receive frames from the external network interconnect node and forward them according to a Virtual Local Area Network (VLAN) tagging forwarding process to other internal network interconnect node(s) or internal network node(s) based on whether the network interconnect node is active for the service associated with the frames. The network interconnect node may receive frames from other internal network interconnect node(s) or from internal network nodes and forward them according to the VLAN tagging forwarding process to other internal network interconnect nodes, internal network nodes or the external network interconnect node based on whether the frames are encapsulated frames and/or whether the network interconnect node is active for the service.

18 Claims, 11 Drawing Sheets

(51) Int. Cl.
*H04L 12/46* (2006.01)
*H04L 12/715* (2013.01)
*H04L 12/725* (2013.01)

(56) References Cited

U.S. PATENT DOCUMENTS

| | | | |
|---|---|---|---|
| 2003/0037163 A1* | 2/2003 | Kitada et al. | 709/236 |
| 2004/0083295 A1* | 4/2004 | Amara et al. | 709/229 |
| 2007/0086361 A1* | 4/2007 | Allan et al. | 370/254 |
| 2008/0267198 A1* | 10/2008 | Sajassi | 370/401 |
| 2009/0037607 A1* | 2/2009 | Farinacci et al. | 709/249 |
| 2010/0158024 A1* | 6/2010 | Sajassi et al. | 370/401 |
| 2010/0165995 A1* | 7/2010 | Mehta et al. | 370/400 |
| 2010/0226368 A1* | 9/2010 | Mack-Crane et al. | 370/390 |
| 2012/0113835 A1* | 5/2012 | Alon et al. | 370/252 |

OTHER PUBLICATIONS

Farkas, "Resilient Network Interconnect Functionalities", Sep. 16, 2010, retrieved from the internet.
MEF Forum, "External Network Network Interface (ENNI)—Phase 1", Internet Citation, Jan. 31, 2010, retrieved from the internet.
Haddock, "Resilient Network Interconnect Using Distributed Link Aggregation", Aug. 31, 2010, retrieved from the internet.
Farkas et al, "Data Plane for Resilient Network Interconnect", Jan. 3, 2011, retrieved from the internet.
IEEE Std 802.1ah, "American National Standard for Determination of the Imaging Performance of X-Ray and Gamma-Ray Systems for Cargo and Vehicle Security Screening", IEEE Standard, IEEE, Piscataway, NJ, Aug. 14, 2008.

* cited by examiner

DATA PLANE FOR RESILIENT NETWORK INTERCONNECT

This application is a national stage of PCT/EP11/03033, filed Jun. 20, 2011, which in turn claims the priority of U.S. Provisional Application 61/422,992 filed Dec. 14, 2010, the priority of both of which are claimed hereby and both of which are incorporated herein by reference.

TECHNICAL FIELD

The invention generally relates to the field of data planes for network interconnect (NI) nodes. More specifically, the invention relates to a technique for forwarding frames received by a network interconnect (NI) node of an internal network from at least one of an external network and the internal network.

BACKGROUND

The IEEE Std 802.1ah-2008 standard defines 3 classes of service access protection. Class I service interfaces are unprotected, Class II service interfaces provide link resiliency while Class III service interfaces represent link and node redundant service interfaces. The operation of a Class III service interface switches between access nodes within both the customer and provider networks. Therefore, protection switching over a Class III service interface always results in state changes spreading over the customer and provider networks. A Class IV service interface which in addition to the Class III capabilities provides resiliency to state changes within the networks was left as an exercise for the future.

MEF 26 introduces a standard Ethernet interconnection interface in order to make Carrier Ethernet interconnections simpler and to accelerate the global adoption of Carrier Ethernet with a standard Global Interconnection mechanism. MEF 26 specifies the reference point that is the interface between two Metro Ethernet Networks (MENs) where each operator MEN is under the control of a distinct administration authority. The External Network Network Interface (ENNI) is intended to support the extension of Ethernet services across multiple operator MENs. MEF 26 enables interconnectivity between Carrier Ethernet networks from multiple operators. The ENNI is the reference point representing the boundary between two Operator MENs that are operated as separate administrative domains so that frames can be exchanged between ENNIs of the Operator MENs.

Furthermore, MEF has specified requirements for user to network interfaces (UNI).

There is ongoing work in IEEE and in MEF to extend Ethernet network interconnect capabilities to support node redundant network interconnect that would support state change resiliency (corresponding to the "Class IV" service interface). IEEE 802.1 will define a resiliency solution for the network interconnect aimed to be applied in network network and user network interfaces.

Based on the ongoing work on IEEE and MEF, the requirements on how the data plane should work are as follows:

1) Each provider selects an external link for forwarding frames of a service independently of the peer provider's selection, i.e. the decision which external link to use for sending frames to the peer is the sole decision of the sender provider. The peer provider has to live with that choice. This service management is referred to as non-congruent service management.

2) Alternatively, the peer providers may decide to make a joint decision on the external link selection and use the same external link for sending and receiving frames. This is referred to as congruent service management.

3) If a congruent service is misconfigured, the service may appear as non-congruent. In this case, the Layer2 (L2) NI has to handle it as an ordinary non-congruent service.

There is a need to be able to forward frames between L2 NI nodes of the same provider without mixing the frames that come from or go to an external link with the frames that remain network internal. In existing solutions, this is achieved by encapsulating the frames that are either received from or destined to the ENNI. The existing solutions on service access protection are mainly suited for Class III service interfaces and do not provide protection from state changes within the different interconnected networks.

The existing solutions have the following problems. They do not provide a means for tunneling frames between the L2 NI nodes of a given provider. As a consequence, the existing solutions cannot provide the data plane for emerging new requirements. Further, they are not able to use the network internal routing protocol (e.g. Multiple Spanning Tree Protocol (MSTP)) to protect the tunnel between the L2 NI nodes. Still further, current service access protection methods cannot be used in combination with Virtual Private Local Area Network (LAN) Service (VPLS).

SUMMARY

Accordingly, there is a need for an improved technique for forwarding frames received by a network interconnect (NI) node.

According to a first aspect, a method for forwarding frames received by a network interconnect node of an internal network is provided. The internal network comprises the network interconnect node, one or more internal network nodes and one or more other internal network interconnect nodes. The network interconnect node has a network interconnect interface for communicating with an external network interconnect node of an external network and a network interface for communicating with one or more of the internal network nodes and with one or more of the other internal network interconnect node, wherein the frames are related to a service provided by at least one of the external network and the internal network. The method comprises at least one of the steps of: receiving, from the external network interconnect node, frames at the network interconnect interface and forwarding according to a Virtual Local Area Network (VLAN) tagging forwarding process, by the network interconnect node, the frames to one or more of the internal network nodes or to one or more of the other internal network interconnect nodes on a network link via the network interface by considering whether the network interconnect node is active for the service associated with the frames; and receiving, from one or more of the internal network nodes or from one or more of the other internal network interconnect nodes, frames at the network interface and forwarding according to a VLAN tagging forwarding process, by the network interconnect node, the frames to one or more of the internal network nodes or to one or more of the other internal network interconnect nodes on a network link via the network interface or to the external network interconnect node via the network interconnect interface based on at least one of whether the frames are encapsulated frames and whether the network interconnect node is active for the service.

In accordance with a first variant of the first aspect, the method may comprise further steps. For example, if the frames are received from the external network interconnect node by the network interconnect interface, the method in accordance with the first variant may comprise the step of determining whether the network interconnect node is active for the service associated with the frames. Additionally, the method according to the first variant may comprise the steps of forwarding, by the network interconnect node, the frames to one or more of the internal network nodes or to one or more of the other internal network interconnect nodes on a network link via the network interface according to a VLAN tagging forwarding process, if the network interconnect node is active for the service, and encapsulating, by the network interconnect node, the frames and forwarding, by the network interconnect node, the encapsulated frames to one or more of the other internal network interconnect nodes n a network link via the network interface according to a VLAN tagging forwarding process, if the network interconnect node is not active for the service (i.e., is passive for the service).

Alternatively or additionally to the further steps of the method according to the first variant of the first aspect, the method may comprise further steps in accordance with a second variant of the first aspect. The method according to the second variant may further comprise the step of, if the frames are received from one or more of the internal network nodes or from one or more of the other internal network interconnect nodes by the network interface, determining whether the frames are encapsulated frames. If it is determined that the frames are encapsulated frames, the method according to the second variant may further comprise the steps of: decapsulating, by the network interconnect node, the encapsulated frames; determining whether the network interconnect node is active for the service associated with the decapsulated frames; and if the network interconnect node is active for the service, forwarding, by the network interconnect node, the frames to one or more of the internal network nodes or to one or more of the other internal network interconnect nodes on a network link via the network interface according to a VLAN tagging forwarding process, and, if the network interconnect node is not active for the service (i.e., is passive for the service), forwarding, by the network interconnect node, the frames to the external network interconnect node via the network interconnect interface according to a VLAN tagging forwarding process. If it is determined that the frames are not encapsulated frames, the method according to the second variant may further comprise the steps of: determining whether the network interconnect node is active for the service associated with the frames; and if the network interconnect node is not active for the service (i.e., is passive for the service), forwarding, by the network interconnect node, the frames to one or more of the internal network nodes or to one or more of the other internal network interconnect nodes on a network link via the network interface according to a VLAN tagging forwarding process, and, if the network interconnect node is active for the service, at least one of forwarding, by the network interconnect node, the frames to the external network interconnect node via the network interconnect interface according to a VLAN tagging forwarding process and encapsulating, by the network interconnect node, the frames and forwarding, by the network interconnect node, the encapsulated frames to one or more of the other internal network interconnect nodes on a network link via the network interface according to a VLAN tagging forwarding process.

If it is determined in the method according to the second variant of the first aspect that the frames are not encapsulated frames, the method may, in one implementation of the second variant, further comprise the step of deciding whether to forward the frames to the network interconnect interface to be forwarded to the external network interconnect node or to encapsulate the frames and to forward the encapsulated frames to one or more of the other internal network interconnect nodes on a network link. This additional step of deciding may be based on the configurations of the service.

In accordance with the first aspect the VLAN tagging forwarding process may be a IEEE 802.1Q forwarding process. Further, the frames may be Ethernet frames and the network interconnect interface may be an External Network Network Interface (ENNI) or a User Network Interface (UNI). Likewise, the external network may be an External Network ("EN") or a User Network (UN). The network link between the network interconnect node and one or more of the other internal network interconnect nodes may comprise an overlay tunnel or a direct physical link, e.g. the network link between the network interconnect node and one or more of the other internal network interconnect nodes may be an overlay tunnel or a direct physical link.

The method according to the second variant of the first aspect may further comprise, if the frames are encapsulated frames and if the network interconnect node is active for the service, the step of learning, by the network interconnect node, the source MAC address in the frames as the frames arrived from the network interconnect interface.

According to a second aspect, a computer program product is provided, comprising program code portions for performing steps of anyone of the method aspects described herein, when the computer program product is run on one or more computing devices. The computer program product may be stored on a computer readable recording medium.

According to a third aspect, a network interconnect node for forwarding frames received by the network interconnect node of an internal network is provided. The internal network comprises the network interconnect node, one or more internal network nodes and one or more other internal network interconnect nodes. The frames are related to a service provided by at least one of the external network and the internal network. The network interconnect node comprises: a network interconnect interface for communicating with an external network interconnect node of the external network, wherein the network interconnect interface is adapted to receive the frames from the external network interconnect node; a network interface for communicating with one or more of the internal network nodes and with one or more of the other internal network interconnect nodes, wherein the network interface is adapted to receive the frames from one or more of the internal network nodes and from one or more of the other internal network interconnect nodes; a first forwarding component for forwarding according to a Virtual Local Area Network (VLAN) tagging forwarding process the frames received by the network interconnect interface to one or more of the internal network nodes or to one or more of the other internal network interconnect nodes on a network link via the network interface by considering whether the network interconnect node is active for the service associated with the frames; and a second forwarding component for forwarding according to a VLAN tagging forwarding process the frames received by the network interface to one or more of the other internal network interconnect nodes or one or more of the internal network nodes on a network link via the network interface or to the external network interconnect node via the network interconnect interface based on at least one of whether the frames are encapsulated frames and whether the network interconnect node is active for the service.

In accordance with a first realization of the third aspect, the network interconnect node may further comprise a first active/passive determining component for determining whether the network interconnect node is active for the service associated with the frames received by the network interconnect interface. The first forwarding component may then be adapted to forward the frames to one or more of the internal network nodes or to one or more of the other internal network interconnect nodes on a network link via the network interface according to a VLAN tagging forwarding process, if the network interconnect node is active for the service, and to encapsulate the frames received by the network interconnect interface and to forward the encapsulated frames to one or more of the other internal network interconnect nodes on a network link via the network interface according to a VLAN tagging forwarding process, if the network interconnect node is not active for the service (i.e., is passive for the service).

In accordance with a second realization of the third aspect (which may/may not be combined with the first realization of the third aspect), the network interconnect node may further comprise an encapsulating determining component for determining whether the frames received by the network interface are encapsulated frames, a decapsulating component and a second active/passive determining component. If it is determined by the encapsulating determining component that the frames received by the network interface are encapsulated frames: the decapsulating component may be adapted to decapsulate the encapsulated frames; the second active/passive determining component may be adapted to determine whether the network interconnect node is active for the service associated with the decapsulated frames; and the second forwarding component may be adapted to forward the frames to one or more of the internal network nodes or to one or more of the other internal network interconnect nodes on a network link via the network interface according to a VLAN tagging forwarding process, if the network interconnect node is active for the service, and may be adapted to forward the frames to the external network interconnect interface via the network interconnect interface according to a VLAN tagging forwarding process, if the internal network interconnect node is not active for the service (i.e., is passive for the service). If it is determined by the encapsulating determining component that the frames received by the network interface are not encapsulated frames: the second active/passive determining component may be adapted to determine whether the network interconnect node is active for the service associated with the frames; and the second forwarding component may be adapted to forward the frames to one or more of the internal network nodes or to one or more of the other internal network interconnect nodes on a network link via the network interface according to a VLAN tagging forwarding process, if the network interconnect node is not active for the service (i.e., is passive for the service), and may be adapted to at least one of forward the frames to the external network interconnect node via the network interconnect interface according to a VLAN tagging forwarding process and to encapsulate the frames and forward the encapsulated frames to one or more of other internal network interconnect nodes on a network link via the network interface according to a VLAN tagging forwarding process, if the network interconnect node is active for the service.

According to the third aspect, the network interconnect node may further comprise a Provider Edge Bridge ("PEB"), a Provider Backbone Edge Bridge ("PBEB") or a Virtual Private Local Area Network Service ("VPLS") Provider Edge ("PE") node.

Many realizations of the network interconnect node are conceivable.

For example, at least one of the first active/passive determining component and the second active/passive determining component may comprise at least one S-tagged or at least one C-tagged Virtual Local Area Network ("VLAN") Identifier ("VID") switch.

In accordance with one realization, at least one of the first forwarding component and the second forwarding component may comprise at least one S-tagged or C-tagged component, and an S-tagged or C-tagged Media Access Control "MAC" relay. At least one of the first forwarding component and the second forwarding component may comprise at least one S-tagged or C-tagged VID switch.

In accordance with another realization, at least one of the first forwarding component and the second forwarding component may comprise at least one I-tagged component and a B-tagged Media Access Control ("MAC") relay.

Independent of the implementation of the first and second forwarding components, the encapsulating determining component and the decapsulating component may be embodied in the S-tagged or C-tagged MAC relay or in the B-tagged MAC relay.

By means of the above described aspects (independent of the concrete realization), a fully specified data plane solution for a node protected L2 network interconnect is provided. With the proposed data plane advantageous options of the control plane functionality that are applicable to S-tagged or C-tagged external interfaces, are supported. It is conceivable that the frame format on the external links of the network interconnect node may be S-tagged or C-tagged. This is fully compliant to MEF.

The data plane proposed may be based on network internal overlay tunnels and may support non-congruent and congruent services. Congruent services fall back to non-congruent services if the peer providers' external link preferences do not match.

Special cases of the proposed data plane solution may include: 1) Direct physical links used instead of overlay tunnels, 2) L1 protected tunnels (e.g. Link Aggregation Group (LAG)), and 3) Further control plane options, i.e. the proposed solution may be able to support all control plane flavors.

The tunnel between, for example, the L2 network interconnect nodes of a provider, e.g. the network interconnect node and the at least one internal network interconnect node, may be protected by the routing protocol of the provider, i.e. it may be an overlay tunnel. The external networks connected to the network interconnect node, e.g. the L2 network interconnect node, may be Provider Bridge (PB), Provider Backbone Bridge (PBB) or VPLS networks.

BRIEF DESCRIPTION OF THE DRAWINGS

In the following, the invention will further be described with reference to exemplary embodiments illustrated in the figures, in which.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, the invention may be practiced in any network or between any networks to which mobile or stationary users may attach.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Figure 1:
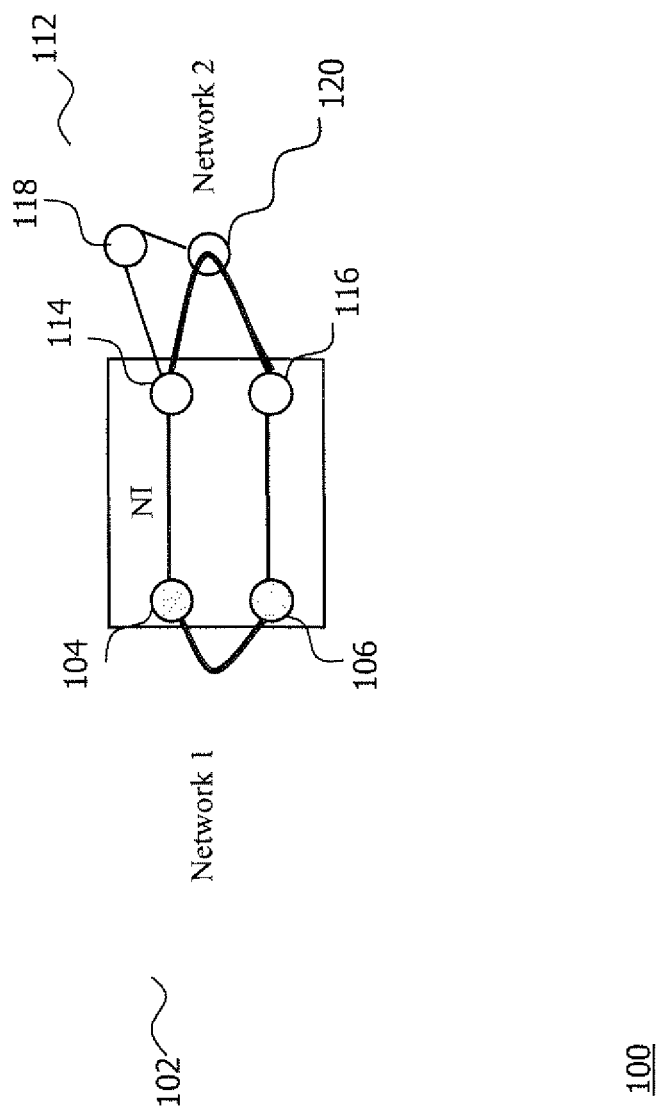
FIG. 1 is a schematic illustration of network interconnect nodes interconnecting two networks.

FIG. 1 shows a schematic illustration of a first network 102 and a second network 112. The first network may be an External Network (EN) or a User Network (UN). The second network 112 may be an internal network of a certain provider. As illustrated in FIG. 1, the first network 102 and the second network 112 are separate from each other such that a service provided by the first network 102 can only be received by network elements contained in the first network 102 or by network elements coupled to the first network 102.

As can be seen from FIG. 1, both networks 102, 112, respectively (and exemplarily) comprise two NI nodes 104, 106, 114, 116 for interconnecting the first and second network. In particular, the first network 102 comprises two NI nodes 104, 106. It is assumed in the following without limitation that the first network 102 is an EN. In accordance therewith, the NI nodes 104, 106 will in the following be named without limitation external NI (ENI) nodes 104, 106. Alternatively, the first network 102 may be a UN and the NI nodes 104, 106 may then be user network interconnect (UNI) nodes. Similarly, the second network 112 comprises two network interconnect (NI) nodes 114, 116. It is assumed in the following without limitation that the second network 112 is an internal network. In accordance therewith it is assumed in the following without limitation that the two NI nodes 114, 116 are internal NI nodes. However, in order to distinguish between the two NI nodes 114, 116, one of which will in the following be named without limitation NI node 114 and the other of which will in the following be named without limitation internal NI node 116. As can be further seen, the second (internal) network 112 exemplarily comprises two further network nodes 118, 120 which are not NI nodes. However, the second network 112 may comprise more than two of such network nodes 118, 120. In the following the two network nodes 118, 120 will be named without limitation internal network nodes. Like the second (internal) network 112, also the first (external) network 102 may comprise such further network nodes (equivalent or similar to the network nodes 118, 120). It has to be noted that the configuration shown in FIG. 1 is merely exemplary. For example, it is very well conceivable that the first network 102 and the second network 112 respectively comprise more than two NI nodes, like any conceivable number of NI nodes.

In the example shown in FIG. 1, the external NI nodes 104, 106 are connected with each other via an overlay tunnel. However, this is merely exemplary, as the NI nodes 104, 106 can also be connected via a direct network link. The foregoing also applies to the link between the NI node 114 and the internal NI node 116 of the internal network 112. The NI node 114 and the internal NI node 116 may also be connected via the internal network node 120, as exemplarily illustrated in FIG. 1. One or more of the NI nodes 104, 106, 114, 116 may be L2 NI nodes. For example, all NI nodes 104, 106, 114, 116 in the EN and the internal network may be L2 NI nodes. The L2 NI nodes may respectively be realized as a Provider Edge Bridge (PEB), a Provider Backbone Edge Bridge (PBEB) or a Virtual Private Local Area Network (LAN) Service (VPLS) Provider Edge (PE) node.

The data plane proposed in FIG. 1, may allow (if at least one of the ENI nodes 104, 106 and the internal NI node 116 and the NI node 114 are connected via an overlay tunnel) the network internal overlay tunnel end port to be changed dynamically if the routing protocol configuration changes or there is a failure event that the routing protocol handles.

Figure 2:
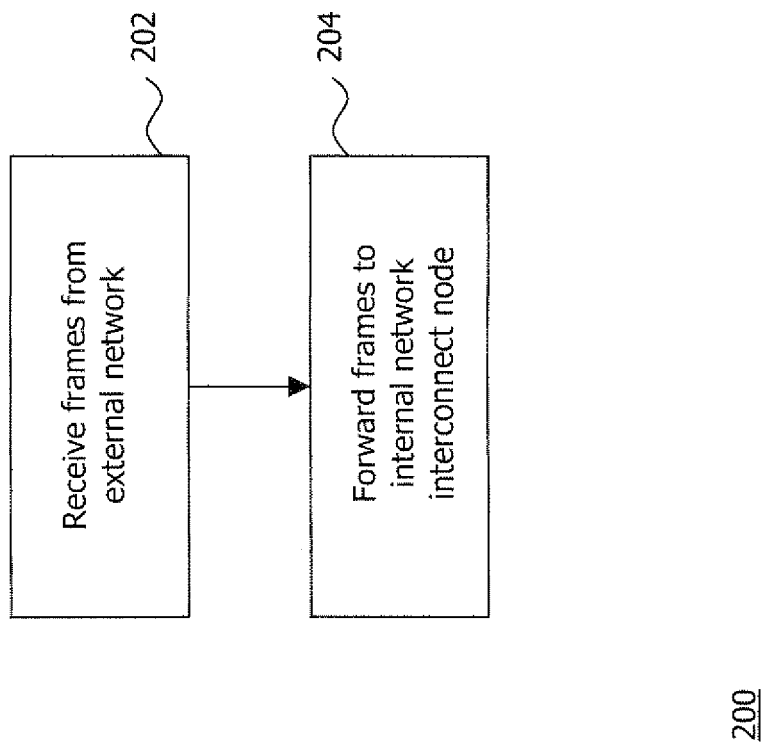
FIG. 2 is a schematic illustration of a flow diagram of a first method embodiment.
Figure 5:
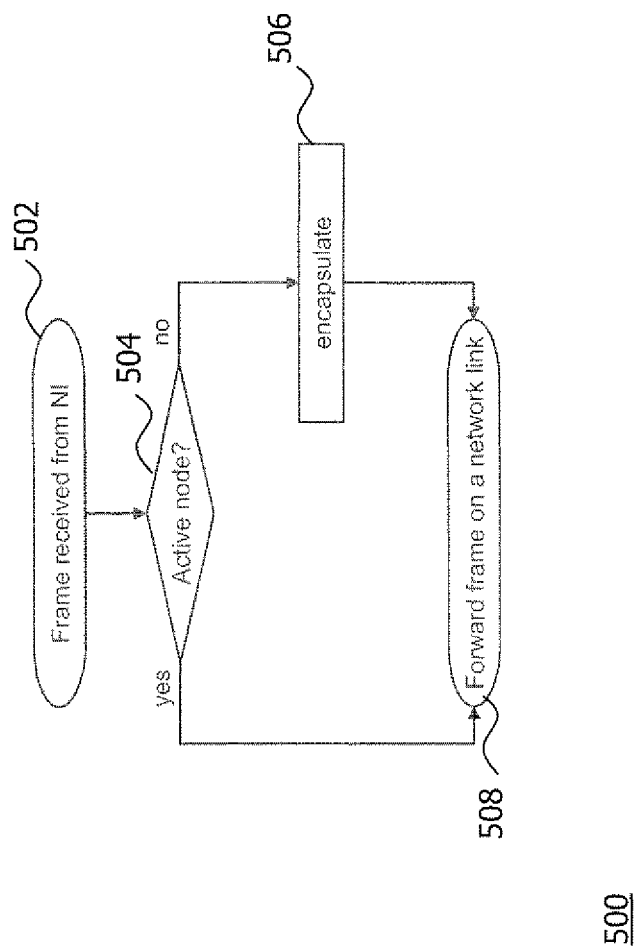
FIG. 5 is a schematic illustration of a flow diagram of a third method embodiment.
Figure 6:
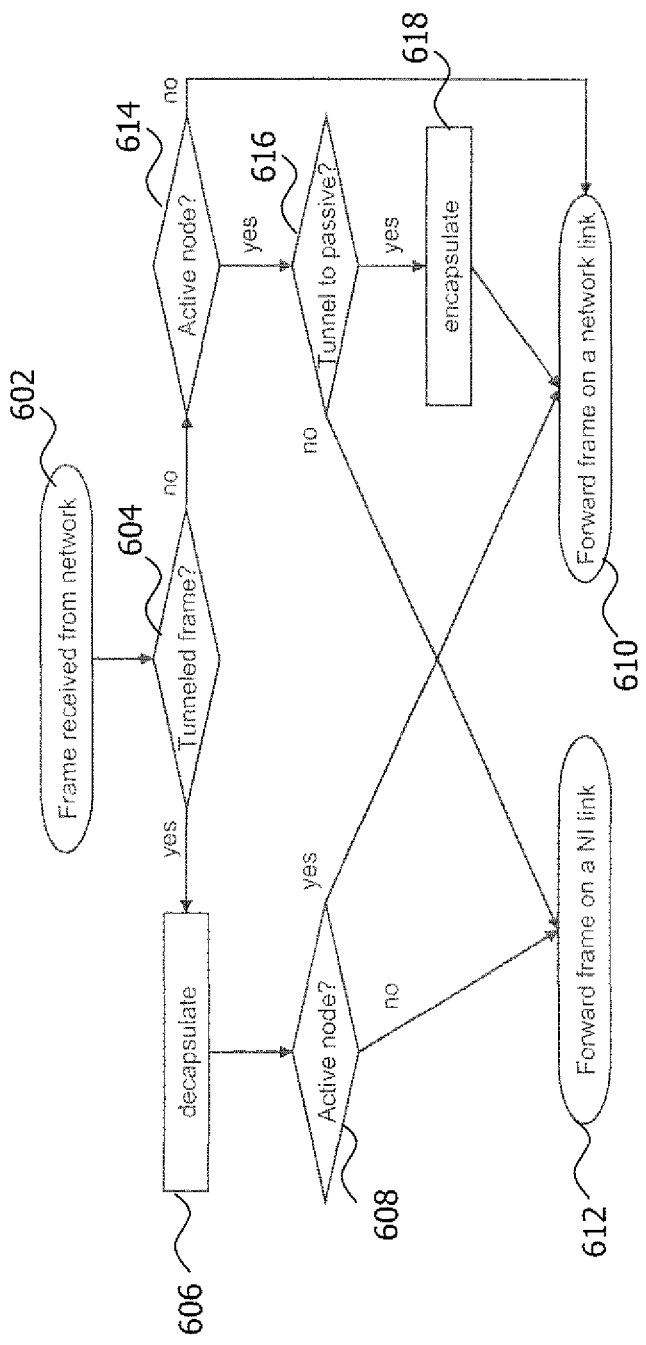
FIG. 6 is a schematic illustration of a flow diagram of a fourth method embodiment.

FIG. 2 shows a flow diagram of a first method embodiment implemented in one of the network interconnect nodes shown in FIG. 1. It is assumed in the following without limitation that the first method embodiment of FIG. 2 and also the second to fourth method embodiments of FIGS. 3, 5 and 6 are respectively implemented in the NI node 114 of FIG. 1.

The network interconnect node 114 receives in step 202, from the ENI node 104, frames provided by the external network 102. For receiving the frames from the ENI node 104, the NI node 114 comprises a NI interface. After receiving the frames from the ENI node 104 via the NI interface, the NI 114 forwards, in step 204, according to a Virtual Local Area Network (VLAN) tagging forwarding process the frames to the internal NI node 116 or to the internal network node 120 on a network link, e.g. an overlay tunnel, by considering whether the NI 114 node is active for the service associated with the frames. For forwarding the frames to the internal NI node 116 or to the internal network node 120, the NI node 114 comprises a network interface.

Figure 3:
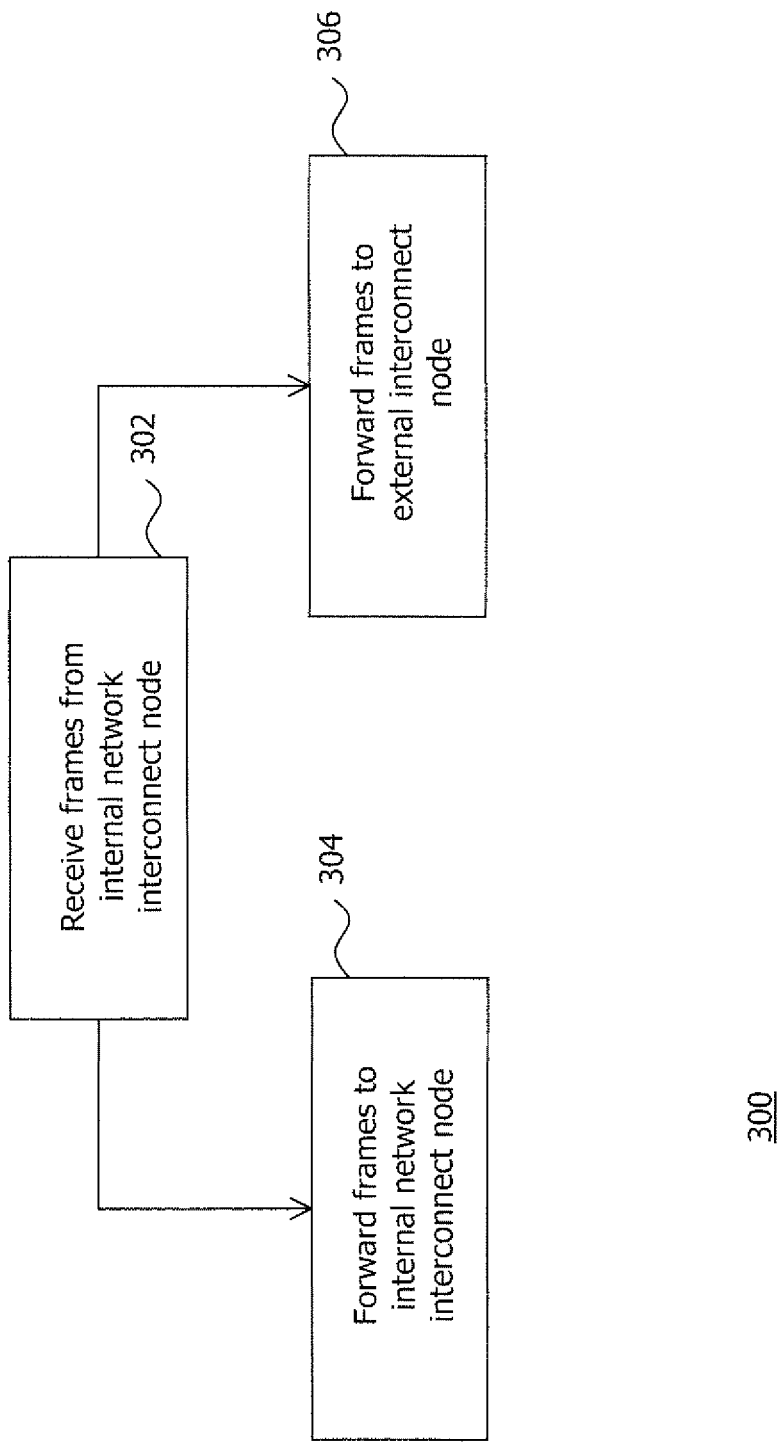
FIG. 3 is a schematic illustration of a flow diagram of a second method embodiment.

FIG. 3 shows a flow diagram of a second method embodiment implemented in one of the NI nodes 104, 106, 114, 116 shown in FIG. 1. It is again assumed without limitation that the second method embodiment of FIG. 3 is implemented in the NI 114 of FIG. 1.

The NI node 114 receives in step 302, from an internal NI node (not shown in FIG. 1) or from the internal network node 118 contained in the internal network 112, frames at the network interface. Then, the NI node 114, in step 304, forwards according to a VLAN tagging forwarding process the frames to the internal network node 120 or to the internal NI node 116 on a network link, e.g. an overlay tunnel, via the network interface. Alternatively to step 304, the NI node 114 forwards, in step 306, according to a VLAN tagging forwarding process the frames to the ENI node 104 via the NI interface. The decision whether step 304 or 306 is performed is based on at least one of whether the frames are encapsulated frames and whether the NI node 114 is active for the service related to the frames.

Figure 4:
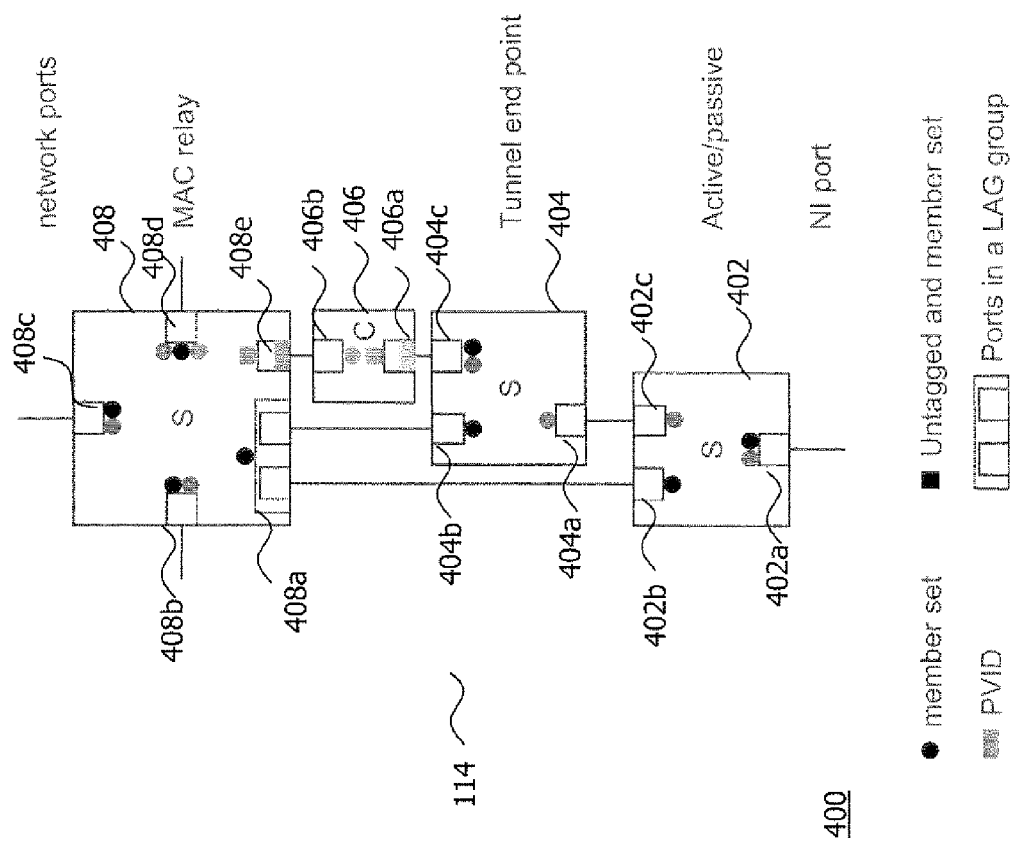
FIG. 4 is a schematic illustration of one of the network interconnect nodes of FIG. 1 according to a first device embodiment.

FIG. 4 shows a first device embodiment. The first device embodiment is configured to perform the two method embodiments described with respect to FIGS. 2 and 3. The first device embodiment is further configured to perform the third method embodiment shown in FIG. 5 and the fourth method embodiment shown in FIG. 6.

At first, the method steps of the third and fourth method embodiments will be explained in an abstract manner (without detailed reference to the first device embodiment shown in FIG. 4) with respect to FIGS. 5 and 6. Afterwards, the is specific implementation of the third and fourth method embodiment using the first device embodiment of Fig. 4 and using the second to fifth device embodiments of FIGS. 7 to 10 will be explained.

According to the third method embodiment of FIG. 5, frames are received in step 502 on the NI interface of the NI node 114, in particular an NI port (external facing port) of the NI interface. These frames are then handled by the NI node 114 in the following manner. After a frame has been received, the NI node 114 determines in step 504 whether the NI node 114 is active for a service (by means of a VLAN identifier (VID)). If the NI node 114 is active (as being perceived from the network internal routing perspective) for the service (containing the VID), the NI node 114 forwards the frame as a regular frame of the service in step 508. If the node is passive for the service (again as being perceived from the network internal routing perspective), the NI node 114 encapsulates the frame in step 506 and forwards the encapsulated frame to the output port of the tunnel (according to the operation of the NI protocol), thus the frame is forwarded to an active node in step 508, e.g. the internal NI node 116.

FIG. 6 shows how an NI node 114 forwards a frame, which is received (in step 602) on regular network ports, e.g. network ports of the network interface. After receiving the frame it is determined in step 604 whether the frame is encapsulated.

If the frame is received on the VID representing an overlay tunnel (i.e., is an encapsulated frame), the frame is decapsulated in step 606. Then, it is determined in step 608 whether the NI node 114 is active for the service of the decapsulated frame. If the NI node 114 is active for the service associated with the decapsulated frame, the decapsulated frame is allowed to enter the provider's network and is forwarded, in step 610, as a regular data frame on a network link via the network interface, e.g. to the internal NI node 116 or to the internal network node 120. If the NI node 114 is passive for the service associated with the decapsulated frame, it forwards, in step 612, the decapsulated frame on an NI port of the NI interface, e.g. to the external NI node 104, because the frame was sent by the active node in order to hand it off to the NI.

If it is determined in step 604 that the frame is a regular frame (not encapsulated) and it is determined in step 614 that the NI node 114 is passive for the regular data frame, i.e. for a non-tunnelled frame, the passive NI node 114 keeps the frame network internal and forwards it to network ports of the network interface only (step 610). If the NI node 114 is active for the service, then it forwards the non-tunnelled frames either directly to the NI port of the NI interface (and thereby to the ENI node 104) (steps 616 and 612) or the NI node 114 encapsulates (step 618) and tunnels the frame to the internal NI node 116 (step 610). The decision in step 616 is e.g. made based on the service configurations and/or a hash decision, which provide the outbound external link for the service.

The third and fourth method embodiments of FIGS. 5 and 6 explicitly contain the implementation of split horizon between the provider network and the external interface. This is achieved because passive nodes can only forward a tunnelled frame to the NI port (of the NI interface) whereas the active node can only forward a tunnelled frame to a network port (of the network interface).

In this context it is worth noting that non-congruent service behaviour leads to asymmetric forward and backward frame forwarding on the external links. Nonetheless, a symmetric forwarding principle is needed in order to use MAC learning in the provider networks. In order to solve this, the asymmetric forwarding behaviour at the NI may be hidden from the networks. For this purpose, it is proposed herein that ingress frames to a provider network may enter the provider network on a single port regardless of the external link selection policies of the peer provider. For this purpose, two ways to implement this are proposed: 1) The peer provider link selection policies are hidden by the collector object of the Link Aggregation Group (LAG); or 2) The peer provider link selection policies are hidden by a bridging layer merging function.

The NI node 114 implementations of the first to fourth device embodiments of FIGS. 4 and 7 to 9 use an LAG collector object for merging. The differences implied by using bridging layer merging are detailed with respect to FIGS. 10 and 11 (fifth device embodiment).

Although the specific figures of NI node implementations below use S-tagged external interfaces, the implementations are representative also for C-tagged external interfaces. In case of C-tagged external interfaces, the services get S-tag encapsulated/decapsulated at the NI port, i.e. the NI port is a Customer Network Port (CNP).

In the following it is defined with respect to FIG. 4 how to implement the data plane L2 NI functionality in a Provider Edge Bridge (PEB).

FIG. 4 shows a proposed PEB architecture to implement the data plane of L2 NI based on, without limitation, standard S-component and C-components and also using the components of 802.1AX LAG. There is only a single bridge component that makes a MAC address based relaying decision. This component is referred to as MAC relay 408 in FIG. 4. All other bridge components only make their forwarding decision on a VID if any and are therefore referred to as VID switches in the following. The specifics of this implementation can be described as follows.

The external link is S-tagged, which is the bottommost link and is referred to as active/passive bridge component 402 in the following. The active/passive bridge component 402 is connected to the ENI node 104 by means of a NI port 402a which serves as a NI interface. The overlay tunnel encapsulation is implemented by adding a C-tag (by C-component 406) and a further S-tag (by S-component 404) to the original S-tagged frames. The addition of two tags is needed in order to use standard C-components and S-components. All ingress frames from the NI node 114 are transmitted to a LAG port 408a of the MAC relay 408 regardless of the peer provider's link selection priorities. All frames handed of between the internal network 112 and the NI node 114 are transmitted through the LAG port 408a of the MAC relay 408. In this way, the first device embodiment of FIG. 4 implements a PEB architecture of LAG based NI implementation with 4-tagged tunnels.

Two services are handed off by the NI node 114 in FIG. 4. Firstly, the NI node 114 acts as an active bridge for the service for which the NI node 114 is active. Secondly, the NI node 114 acts as a passive bridge for the service for which the NI node 114 is passive.

The third method embodiment of the flow chart shown in FIG. 5 is implemented by the NI node 114 of FIG. 4 as follows:

The active/passive test is implemented by the S-tagged VID switch marked as active/passive bridge component 402. As exemplarily illustrated in FIG. 4, the bottommost S-tagged VID switch (active/passive bridge component 402) acts as passive for one of the two services received via the network interconnect interface.

In the example of FIG. 4, the active/passive bridge component 402 acts as passive for the left service of the two services at port 402a. The one or more frames related to this (passive) service are forwarded by the active/passive bridge component 402 (via port 402c) to the VID switch marked as tunnel end point 404, which receives the frame via port 404a. The tunnel end point 404 sends the frame for encapsulation to the C-component 406 via port 404c. The C-component receives the frame on port 406a, adds a VID that serves as the tunnel C-VID and forwards the C-tagged frame via port 406b to the MAC relay 408. The MAC relay 408 receives the frame on port 408e and adds a VID that serves as the tunnel S-VID towards the node of the internal network 112, e.g. the internal NI node 116 of the internal network 112, that is active for the service originally received at the NI interface 402 of the active/passive bridge component 402. Then, the MAC relay 408 forwards the frame according to the member set of the corresponding VID on one of the network ports 408b, 408c, 408d which serve as a network interface of the NI node 114.

Exemplarily, the bottommost S-tagged VID switch (the active/passive bridge component 402) acts as active for the right service received on the port 402a of the NI interface and forwards the (active) frame to the LAG group port 408a of the MAC relay 408. The MAC relay 408 associates the source address of the frame with the LAG group 408a and forwards the frame towards the appropriate port 408b, 408c, 408d of the network interface (and thereby to an internal NI node, e.g. the internal NI node 166, of the internal network) based on its MAC address table.

The first device embodiment of FIG. 4 can implement the fourth method embodiment illustrated in the flow chart of FIG. 6 as follows:

The first two steps 602, 604 are implemented by the MAC relay 408. That is, the MAC relay 408 receives the frames via the network interface and determines whether the received frames are tunnel frames.

If the receives frames are tunneled frames, the MAC relay 408 removes the tunnel S-VID from the tunneled frames in step 606 (it is assumed without limitation that the lowest of the three services received at network port 408d is a tunneled frame). Then, step 608 is implemented by the C-component 406 and the tunnel end point 404. The MAC relay 408 then forwards the frames via port 408e to the C-component 406. The C-component 406 removes the tunnel C-VID and forwards the frames via the port 406a to the tunnel end point 404, which receives the frames via port 404c. The VID switch marked as tunnel end point 404 forwards the frames for which the NI node 114 is passive (the left service at the port 404c) via port 404a to the active/passive bridge component 402 which receives the frames via port 402c. The active/passive component 402 forwards the frames via the NI port 402a which serves as the NI interface to the ENI 104 to implement step 612.

The tunnel end point 404 forwards the frames (decapsulated in step 606) for which the NI node 114 is active (the right service at port 404c) to the LAG group port 408a of the MAC relay 408 via port 404b. If the NI node 114 is active for the service, source addresses in tunneled frames are associated with the LAG group port 408a and the MAC relay 408 forwards the frames to the appropriate network port (one of the ports 408b, 408c, 408d) of the network interface. The respective network port then forwards the frames via a network link to an internal NI node, e.g. the internal NI node 116 (step 610).

Non-tunneled frames that contain a VID for which the NI node 114 is passive (one of the services received on one of the network ports 408b, 408c, 408d) are never forwarded towards the LAG group port 408a, which ensures that the frames are kept network internal in the passive node and are not mixed with frames of the same service that may enter from the NI port 402a. As the NI node 114 is passive for this particular service, the NI node 114 is only a transit node in the network if frames belonging to that particular service are not received on the tunnel from the active node. The non-tunneled (passive) frames are simply forwarded by the MAC relay 408 to an internal NI node via one of the ports 408b, 408c, 408d.

Non-tunneled frames that contain a VID for which the NI node 114 is active (one of the services received on one of the network ports 408b, 408e, 408d) enter the LAG group port 408a as a result of standard Ethernet forwarding. The hash function of the LAG group port 408a decides if the frame is directly forwarded to the active/passive bridge component 402 (from LAG group port 408a to port 402b) and thus to NI port 402a or is to be tunneled to another NI node (via one of the network ports 408b, 408c, 408d) before sending it out towards the peer provider. In the latter case, the frame is forwarded via port 408a to port 404b, is forwarded via port 404c to the C-component 406 (via port 406a), is C-tagged, is forwarded via port 406b to the MAC relay 408 via port 408e, where the frame is S-tagged and is finally forwarded to an internal NI node via e.g. port 408d of the network interface. Implementing tunnel end point and active/passive decision making in separate bridge components ensures that the frames bound to the NI node 114 and to the tunnel are kept separated.

Figure 7:
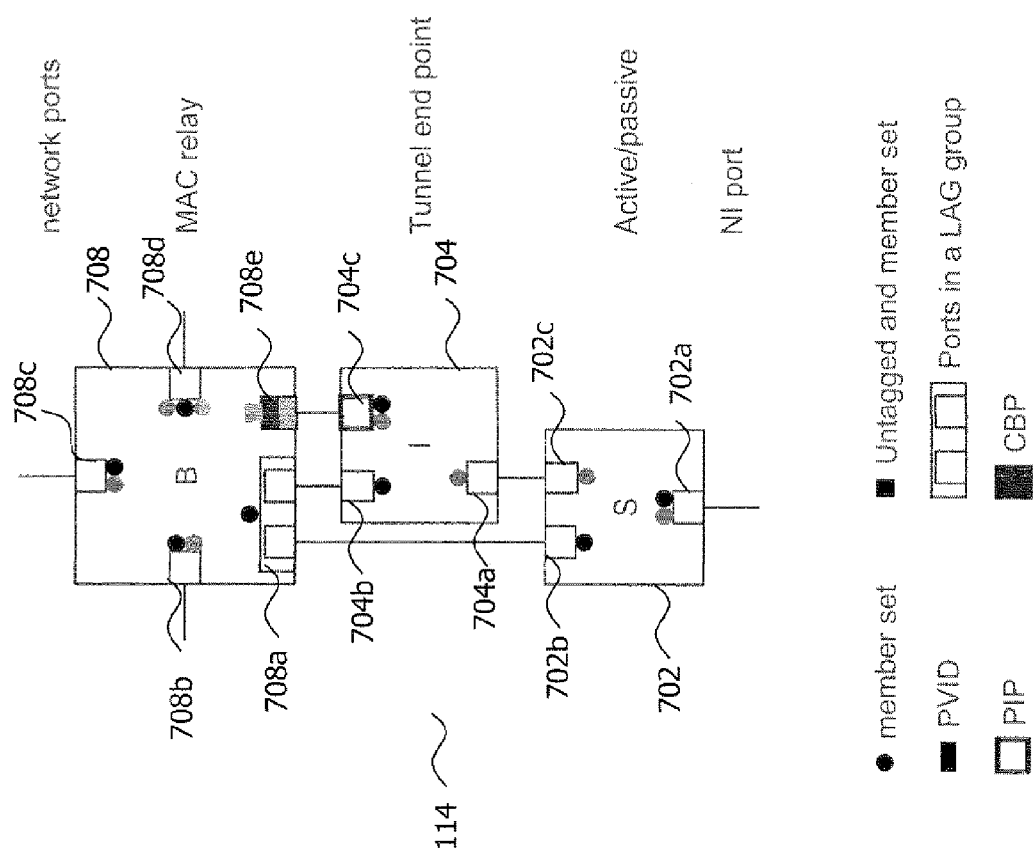
FIG. 7 is a schematic illustration of one of the network interconnect nodes of FIG. 1 according to a second device embodiment.

FIG. 7 shows a PEB variant (second device embodiment) where the tunnel encapsulation/decapsulation functions are changed to PBB, i.e. PBB functionality is introduced to the PEB for tunneling frames, but the provider network remains a PB network for other services, In this context, FIG. 7 shows a PEB architecture of LAG based L2 NI with PBB tunnels.

The frame paths and notations used in FIG. 7 correspond to those in FIG. 4. The only difference is that the tunnel C-VID 406 of the first device embodiment in FIG. 4 is replaced with a standard PBB I-SID (not shown in the figure), thus the tunnel end point 704 is an I-component, and in PBB terminology the tunnel S-VID is called the B-VID (MAC relay 708). In addition, by changing the operation of encapsulation/decapsulation ports, any sort of proprietary tunneling can be added.

In the following it is described how to implement the data plane L2 NI functionality in a Provider Backbone Edge Bridge (PBEB).

Figure 8:
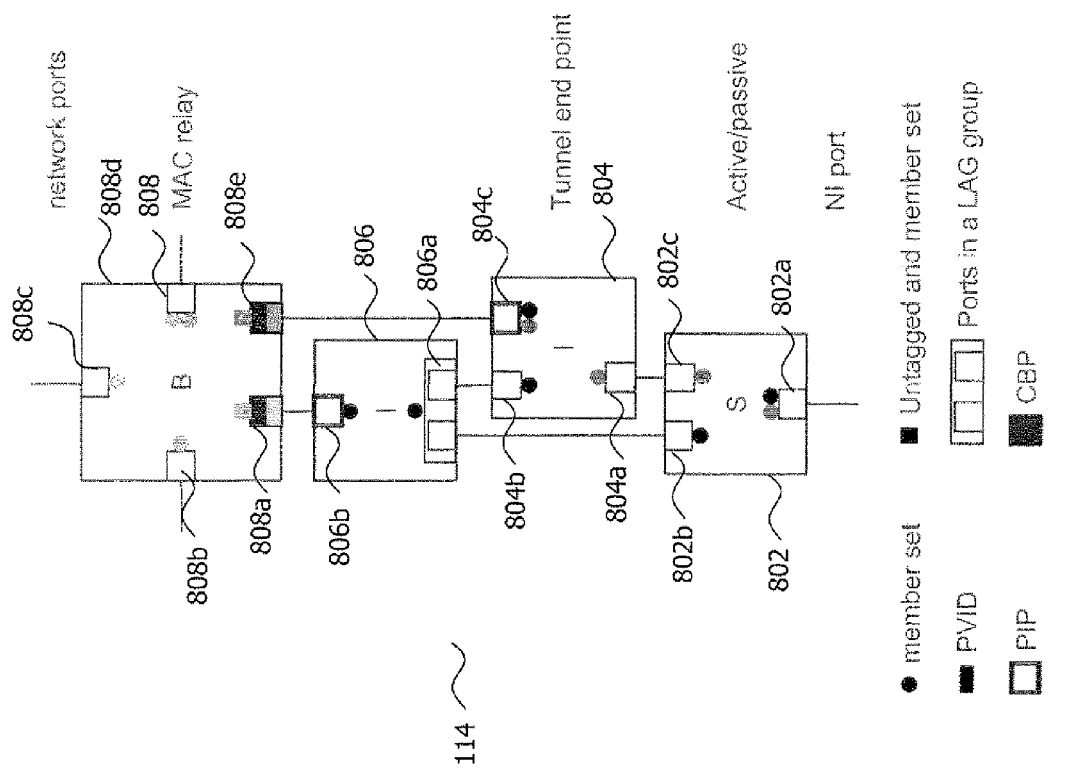
FIG. 8 is a schematic illustration of one of the network interconnect nodes of FIG. 1 according to a third device embodiment.

FIG. 8 (third device embodiment) shows a BEB implementation based on LAG merging. Due to the fact that the BEB is able to tunnel S-tagged frames per standard PBB, the tunnel between the NI nodes 114, 116 is implemented by using standard PBB encapsulation.

From the NI node's 114 point of view, the BEB in FIG. 8 works exactly the same way as the PEB in FIG. 7, i.e. the network internal differences are hidden from the NI implementation. Note that there is no difference regarding the LAG group port including the member set of the LAG group port of FIG. 8 and FIG. 7 because the same type of PBB tunneling is used between active and passive nodes in the two figures.

The difference is that the S-tagged service frames are carried encapsulated with an I-tag and a B-tag within the network because it is a PBB network. The standard BEB encapsulation/decapsulation is performed in the standard way by the B-component 808 and the I-component 806 comprising the LAG group 806a. In this way, FIG. 8 shows a BEB architecture of LAG based L2 NI.

As an alternative of LAG based merging, bridging layer merging can also be used by a BEB.

Figure 9:
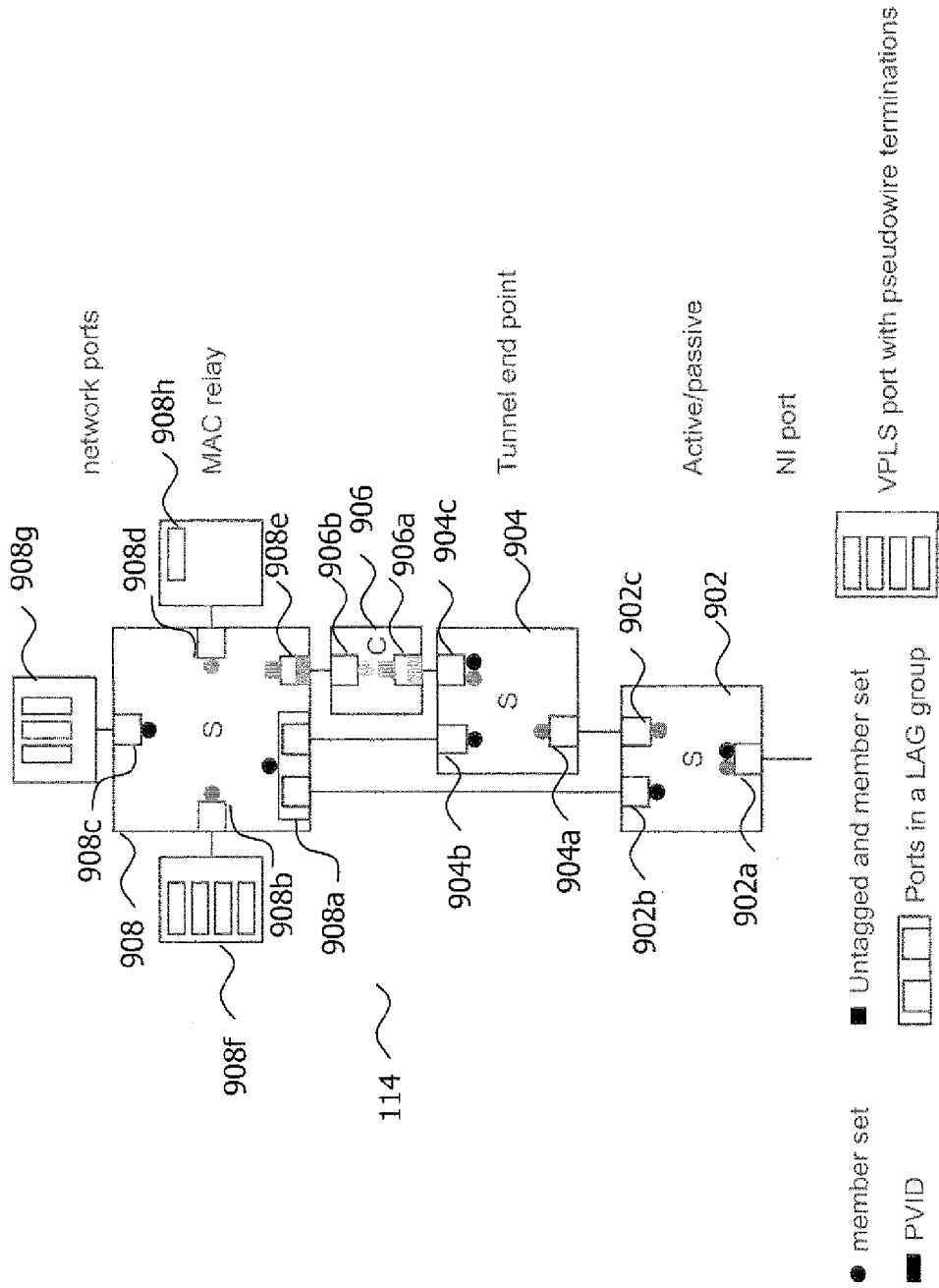
FIG. 9 is a schematic illustration of one of the network interconnect nodes of FIG. 1 according to a fourth device embodiment.

It is now described how to implement the data plane L2 NI functionality in a VPLS PE node, as shown in FIG. 9. FIG. 9 shows a VPLS PE node architecture of LAG based NI implementation.

FIG. 9 (fourth device embodiment) shows a VPLS PE implementation using LAG merging. Due to the fact that the VPLS PE node 114 is able to tunnel S-tagged frames using standard pseudowires, the tunnel between the NI nodes 114, 116 is implemented by using IETF standard Ethernet pseudowire encapsulation, which is illustrated at the top right port 908d of the MAC relay component 908 in the figure by means of the component 908h.

From the NI node's point of view, the VPLS PE node 114 in FIG. 9 operates exactly the same way as the PEB in FIG. 4, i.e. the network internal differences are hidden from the NI implementation, Note that there is no difference between the LAG group ports 408a and 908a including the member set of the LAG group port of FIGS. 9 and 4.

The difference is that the VPLS PE node 114 encapsulates regular services with pseudowire encapsulation. This is achieved in the standard VPLS way by VPLS ports 908f, 908g.

If raw mode pseudowires are used for the tunnel between the NI nodes 114, 116, the NI node 114 removes all service delimiting tags. This means that both the tunnel S-VID and the tunnel C-VID are removed on the VPLS port 908f, 908g and the fact that the frames are tunneled is carried in the pseudowire encapsulation, Thus, the tunnel S-VID and C-VID remains node internal, Consequently, other forms of proprietary tagging on the network internal overlay tunnel may be used. In the same way as on the input VPLS port 908f, 908g, on the tunnel both S and C tags need to be added (by the S-component 904 and the C-component 906, respectively) to establish the node internal part of the tunnel.

As an alternative of LAG based merging, bridging layer merging can also be used by a VPLS PE node 114.

Figure 10:
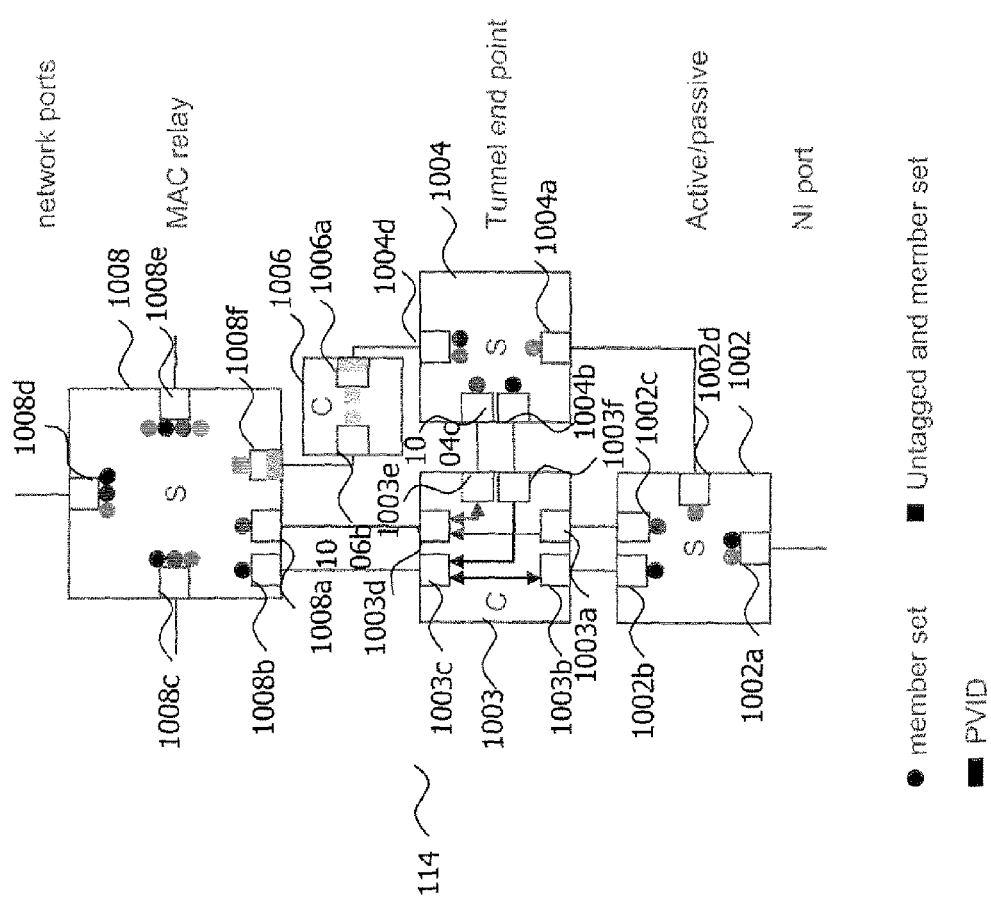
FIG. 10 is a schematic illustration of one of the network interconnect nodes of FIG. 1 according to a fifth device embodiment.

As an alternative to LAG based merging of the device embodiment shown in FIG. 9, a pure bridging layer merging implementation variant is given in FIG. 10 (as a fifth device embodiment). FIG. 10 shows a direct alternative of the PEB shown in FIG. 4, i.e. FIG. 10 shows a PEB architecture of bridged L2 NI with 4-tagged tunnels.

The most significant difference is that the decision whether an active node has to tunnel frames of a service or send them directly to the NI port 1002a is implemented in the bridging layer (as opposed to the hash function of the LAG layer). To achieve this, the bridging layer has to distinguish between services that need tunnelling and services that go directly to the NI port 1002a. Therefore another service VID is added.

The NI node 114 depicted in FIG. 10 hands off three services:

1) The NI node 114 is passive for one of the service VIDs received at one of the network ports 1008c, 1008d, 1008e of the MAC relay 1008;
2) The NI node 114 is active for one of the service VIDs received at one of the network ports 1008c, 1008d, 1008e of the MAC relay 1008 and for one of the service VIDs received at the network port 1008e (the lowest of the four services at network port 1008e); and
3) The NI node 114 tunnels the frames of the lowest service VIDs at network port 1008e via C-component 1006 and S-component 1004 (via ports 1008f, 1006b, 1006a, 1004d) and forwards the frames of the service VID corresponding to the uppermost service at network port 1008c, the furthest right service at the network port 1008d and second highest service at the network port 1008d to the NI port 1002a directly via the C-component 1003 (via port 1008b and port 1003c)).

That is, the service VIDs that the active node has to tunnel have a dedicated ingress/egress port 1008f in the MAC relay 1008 towards the NI port 1002a. The same way, the service VIDs that the active node has to forward directly to the NI port 1002a have a dedicated ingress/egress port 1008b in the MAC relay 1008 towards the NI port 1002a.

Merging is implemented by the added C-component 1003, which is configured as a port switch. The arrow notations used in FIG. 10 are explained in FIG. 11, which shows a port switch notation and implementation.

The C-component 1003 is configured as a port switch by adding C-component internal tags on the input port, by forwarding the frames based on the (local) C-VID and by removing the C-tag on the output port. It is referred to as a port switch because the forwarding decision does not involve any MAC address relaying function, i.e. FDB look-up. In fact, point-to-point connections are provided within the port switch, such that frames received at a port are tagged with a locally valid VID, which VID is then removed before the frame is sent out on the egress port.

Figure 11:
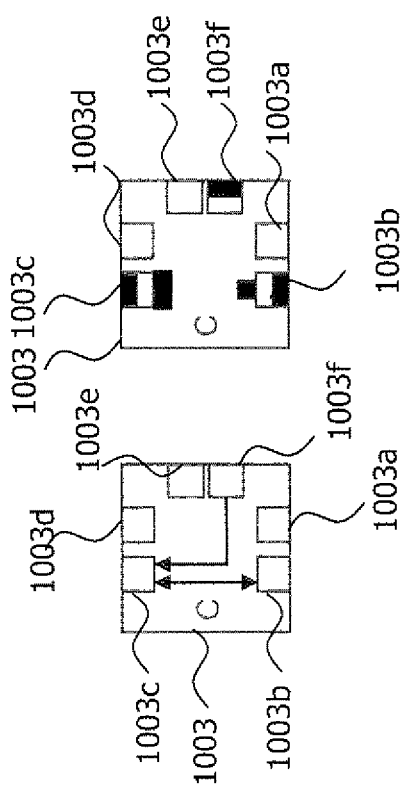
FIG. 11 is a schematic illustration of the tunnel end point shown in FIG. 10.

The C-VID between the ports 1003b and 1003c in FIGS. 10 and 11 implements the port switch in the top down and the bottom up direction. For example, the downward facing port 1003b adds the corresponding C-VID on the frames and the only port eligible for forwarding is the upward facing port 1003c, which removes the corresponding C-VID.

Frames entering on the right hand side port 1003f with the corresponding PVID are forwarded based on the corresponding C-VID added by the input port and forwarded to the same upward facing port 1003c as the ones with the C-VID received at the downward facing port 1003b and forwarded to the upward facing port 1003c. The output port 1003c merges the frames by removing the different C-tags.

In order to change any LAG based NI node 114 implementation to an NI node 114 with bridged merging (as shown in FIGS. 10 and 11), the following has to be done:

The ports included in the LAG group 408a become visible by the bridging layer in that one of the ports 1008a serves as ingress/egress port for services that need tunneling and one of the ports 1008b serves as ingress/egress port for services that are directly forwarded to the NI port 1002a. Further, a port switch implements the merging functionality as shown in FIG. 11. The tunnel end point VID switch 1004 directs services that need to be tunneled to the encapsulation port 1006a. If the NI node 114 is active for a service and if the NI node 114 has to tunnel the frames of the service (the tunneled service received on port 1008e and forwarded on port 1008f via the C-component 1006, which decapsulates the frame, to the tunnel end point 1004), the tunnel end point 1004 directs tunneled frames of the service towards the port 1008a of the MAC relay 1008 that represents the egress/ingress port of the services to be tunneled (through the C-component port switch 1006). If the NI node 114 is active for a service and if the NI node 114 forwards frames of the service to the NI directly (from one of ports 1008c, 1008d, 1008e via port 1008b), the tunnel end point 1004 directs tunneled frames of the service towards the port 1008*b* of the MAC relay 1008 that represents the egress/ingress port of the services forwarded directly to the NI port 1002*a* (through the C-component port switch 1003 via ports 1003, 1003*b*, 1002*b*).

The advantages of the data plane described with respect to the specific embodiments are: 1) The proposed solution provides the data plane needed for a node resilient L2 network interconnect; 2) The LAG based data plane implementation option supports dual homing of any 802.1AX capable host; 3) A single tunnel is used between NI nodes (This is solution with the simplest OAM); 4) The solution support standard and proprietary tunnel implementations; 5) The proposed data plane solution allows the tunnel end port to be changed dynamically; 6) The solution is based on standard bridge components. Thus it builds on existing hardware to the extent possible.

The invention claimed is:

1. A method for forwarding frames received by a network interconnect node of an internal network comprising the network interconnect node, one or more internal network nodes and one or more other internal network interconnect nodes, the network interconnect node comprising a network interconnect interface configured to communicate with an external network interconnect node of an external network and a network interface configured to communicate with one or more of the other internal network interconnect nodes and with one or more of the internal network nodes, wherein the frames are related to a service provided by at least one of the external network and the internal network and the method comprises at least one of:

(1) receiving, from the external network interconnect node, frames at the network interconnect interface and forwarding according to a Virtual Local Area Network (VLAN) tagging forwarding process, by the network interconnect node, the frames by considering whether the network interconnect node is active for the service associated with the frames,
wherein the frames received at the network interconnect interface are forwarded to one or more first forwarding destinations regardless of whether or not the network interconnect node is active for the service,
wherein the one or more first forwarding destinations are determined based on whether or not the network interconnect node is active for the service, and
wherein the one or more first forwarding destinations comprise
one or more of the other internal network interconnect nodes, or
one or more of the internal network nodes; and (2) receiving, from one or more of the other internal network interconnect nodes or from one or more of the internal network nodes, frames at the network interface and forwarding according to the VLAN tagging forwarding process, by the network interconnect node, the frames based on at least one of
whether the frames are encapsulated frames, and
whether the network interconnect node is active for the service,
wherein the frames received at the network interface are forwarded to one or more second forwarding destinations regardless of whether or not the frames are encapsulated, and regardless whether or not the network interconnect node is active for the service, and
wherein the one or more second forwarding destinations are determined based on at least one of whether or not the frames are encapsulated, and whether or not the network interconnect node is active for the service, and
wherein the one or more second forwarding destinations comprise
one or more of the other internal network interconnect nodes, or
one or more of the internal network nodes, or
the external network interconnect node;
if the frames are received from the external network interconnect node by the network interconnect interface, determining whether the network interconnect node is active for the service associated with the frames;
if the network interconnect node is active for the service, forwarding, by the network interconnect node, the frames to one or more of the internal network nodes or to one or more of the other internal network interconnect nodes on a network link via the network interface according to the VLAN tagging forwarding process; and
if the network interconnect node is not active for the service, encapsulating, by the network interconnect node, the frames and forwarding, by the network interconnect node, the encapsulated frames to one or more of the other internal network interconnect nodes on a network link via the network interface according to the VLAN tagging forwarding process.

2. The method of claim 1, wherein the method further comprises, if the frames are received from one or more of the other internal network interconnect nodes or from one or more of the internal network nodes by the network interface, determining whether the frames are encapsulated frames;
wherein, if the frames are encapsulated frames, the method further comprises:
decapsulating, by the network interconnect node, the encapsulated frames;
determining whether the network interconnect node is active for the service associated with the decapsulated frames;
if the network interconnect node is active for the service, learning the source MAC address in the frame as the frame arrived from the network interconnect interface, and forwarding, by the network interconnect node, the frames to one or more of the internal network nodes or to one or more of the other internal network interconnect nodes on a network link via the network interface according to the VLAN tagging forwarding process; and if the network interconnect node is not active for the service, forwarding, by the network interconnect node, the frames to the external network interconnect node via the network interconnect interface, and
wherein, if the frames are not encapsulated frames, the method further comprises:
determining whether the network interconnect node is active for the service associated with the frames;
if the network interconnect node is not active for the service, forwarding, by the network interconnect node, the frames to one or more of the internal network nodes or to one or more of the other internal network interconnect nodes on a network link via the network interface according to the VLAN tagging forwarding process; and
if the network interconnect node is active for the service, at least one of
forwarding, by the network interconnect node, the frames to the external network interconnect node via the network interconnect interface according to the VLAN tagging forwarding process, and
encapsulating, by the network interconnect node, the frames and forwarding, by the network interconnect node, the encapsulated frames to one or more of the other internal network interconnect nodes on a network link via the network interface according to the VLAN tagging forwarding process.

3. The method of claim 2, wherein, if it is determined that the frames are not encapsulated frames, the method further comprises deciding whether
to forward the frames to the network interconnect interface to be forwarded to the external network interconnect node or
to encapsulate the frames and to forward the encapsulated frames to one or more of the other internal network interconnect nodes on a network link,
wherein the decision is based on the configurations of the service.

4. The method of claim 1, wherein the VLAN tagging forwarding process is a IEEE 802.1Q forwarding process.

5. The method of claim 1, wherein the frames are Ethernet frames and the network interconnect interface is an External Network Network Interface ("ENNI") or a User Network Interface ("UNI").

6. The method of claim 1, wherein the network link between the network interconnect node and one or more of the other internal network interconnect nodes comprises an overlay tunnel or a direct physical link.

7. A non-transient computer-readable recording medium which has stored therein a computer program product comprising non-transient program code portions such that when the computer program product recorded on the non-transient computer-readable recording medium is run on a computer system, the computer performs the method as recited in claim 1.

8. A network interconnect node of an internal network comprising the network interconnect node, one or more internal network nodes and one or more other internal network interconnect nodes, the network interconnect node configured to forward received frames, the frames being related to a service provided by at least one of an external network and the internal network, the network interconnect node comprising:
a network interconnect interface adapted to receive the frames from an external network interconnect node of the external network;
a network interface adapted to receive the frames from one or more of the internal network nodes and from one or more of the other internal network interconnect nodes;
a first forwarding component adapted to forward the frames received by the network interconnect interface according to a Virtual Local Area Network (VLAN) tagging forwarding process on a network link via the network interface by considering whether the network interconnect node is active for the service associated with the frames,
wherein the first forwarding component forwards the frames received by the network interconnect interface to one or more first forwarding destinations regardless of whether or not the network interconnect node is active for the service,
wherein the first forwarding component determines the one or more first forwarding destinations based on whether or not the network interconnect node is active for the service, and
wherein the one or more first forwarding destinations comprise
one or more of the other internal network interconnect nodes, or
one or more of the internal network nodes; and a second forwarding component adapted to forward the frames received by the network interface according to the VLAN tagging forwarding process the frames received by the network interface based on at least one of whether the frames are encapsulated frames, and whether the network interconnect node is active for the service,
wherein second forwarding component forwards the frames received by the network interface to one or more second forwarding destinations regardless of whether or not the frames are encapsulated, and regardless whether or not the network interconnect node is active for the service, and
wherein the second forwarding component determines the one or more second forwarding destinations based on at least one of whether or not the frames are encapsulated, and whether or not the network interconnect node is active for the service, and
wherein the one or more second forwarding destinations comprise
one or more of the other internal network interconnect nodes, or
one or more of the internal network nodes, or
the external network interconnect node;
a first active/passive determining component adapted to determine whether the network interconnect node is active for the service associated with the frames received by the network interconnect interface,
wherein the first forwarding component is adapted:
to forward the frames received by the network interconnect interface to one or more of the internal network nodes or to one or more of the other internal network interconnect nodes on a network link via the network interface according to the VLAN tagging forwarding process, if the network interconnect node is active for the service, and
to encapsulate the frames received by the network interconnect interface and to forward the encapsulated frames to one or more of the other internal network interconnect nodes on a network link via the network interface according to the VLAN tagging forwarding process, if the network interconnect node is not active for the service.

9. The network interconnect node of claim 8, further comprising:
an encapsulating determining component adapted to whether the frames received by the network interface are encapsulated frames;
a decapsulating component; and
a second active/passive determining component;
wherein, if it is determined by the encapsulating determining component that the frames received by the network interface are encapsulated frames:
the decapsulating component is adapted to decapsulate the encapsulated frames;
the second active/passive determining component is adapted to determine whether the network interconnect node is active for the service associated with the decapsulated frames; and
the second forwarding component is adapted
to forward the frames to one or more of the internal network nodes or to one or more of the other internal network interconnect nodes on a network link via the network interface according to the VLAN tagging forwarding process, if the network interconnect node is active for the service, and to forward the frames to the external network interconnect node via the network interconnect interface according to the VLAN tagging forwarding process, if the network interconnect node is not active for the service;

wherein, if it is determined by the encapsulating determining component that the frames received by the network interface are not encapsulated frames:

the second active/passive determining component is adapted to determine whether the network interconnect node is active for the service associated with the frames; and the second forwarding component is adapted to forward the frames to one or more of the internal network nodes or to one or more of the other internal network interconnect nodes on a network link via the network interface according to a VLAN tagging forwarding process, if the network interconnect node is not active for the service, and to at least one of forward the frames to the external network interconnect node via the network interconnect interface according to the VLAN tagging forwarding process, and to encapsulate the frames and forward the encapsulated frames to the one or more of the other internal network interconnect nodes on a network link via the network interface according to a VLAN tagging forwarding process, if the network interconnect node is active for the service.

10. The network interconnect node of claim 8, further comprising a Provider Edge Bridge ("PEB"), a Provider Backbone Edge Bridge ("PBEB") or a Virtual Private Local Area Network Service ("VPLS") Provider Edge ("PE") node.

11. The network interconnect node of claim 8, wherein at least one of the first active/passive determining component and the second active/passive determining component comprises at least one S-tagged or at least one C-tagged Virtual Local Area Network ("VLAN") Identifier ("VID") switch.

12. The network interconnect node of claim 8, wherein at least one of the first forwarding component and the second forwarding component comprises at least one S-tagged or C-tagged component, and an S-tagged or C-tagged Media Access Control "MAC" relay.

13. The network interconnect node of claim 8, wherein at least one of the first forwarding component and the second forwarding component comprises at least one I-tagged component and a B-tagged Media Access Control ("MAC") relay.

14. The network interconnect node of claim 12, wherein the encapsulating determining component and the decapsulating component are embodied in the S-tagged or C-tagged MAC relay or in the B-tagged MAC relay.

15. The method of claim 1, wherein the method further comprises performing both (1) and (2) of claim 1.

16. A method of operating a network interconnect node of an internal network, the method comprising:

receiving, at the network interconnect node, frames from an external network interconnect node of an external network, the frames being associated with a service provided by the internal network and/or the external network;

determining, by the network interconnect node, whether the network interconnect node is active or passive for the service associated with the received frames;

forwarding, by the network interconnect node, the received frames to at least one active forwarding destination according to a Virtual Local Area Network (VLAN) tagging forwarding process when it is determined that the network interconnect node is active for the service associated with the received frames; and forwarding, by the network interconnect node, the received frames to at least one passive forwarding destination according to the VLAN tagging forwarding process when it is determined that the network interconnect node is passive for the service associated with the received frames, wherein the at least one active forwarding destination comprises an internal network node or another internal network interconnect node, wherein the at least one passive forwarding destination comprises another internal network interconnect node;

encapsulating, by the network interconnect node, the received frames when it is determined that the network interconnect node is passive for the service associated with the received frames, and wherein the step of forwarding the received frames to the at least one passive forwarding destination comprises forwarding the encapsulated frames to the at least one passive forwarding destination when it is determined that the network interconnect node is passive for the service associated received frames.

17. A method of operating a network interconnect node of an internal network, the method comprising:

receiving, at the network interconnect node, frames from an other node of the internal network, the received frames being encapsulated, the other node being an internal network node or an other internal network interconnect node, the received frames being associated with a service provided by the internal network and/or an external network;

decapsulating, by the network interconnect node, the received encapsulated frames;

determining, by the network interconnect node, whether the network interconnect node is active or passive for the service associated with the decapsulated frames;

forwarding, by the network interconnect node, the decapsulated frames to at least one active forwarding destination according to a Virtual Local Area Network (VLAN) tagging forwarding process when it is determined that the network interconnect node is active for the service associated with the decapsulated frames; and forwarding, by the network interconnect node, the decapsulated frames to an external network interconnect node of the external network when it is determined that the network interconnect node is passive for the service associated with the decapsulated frames, wherein the at least one active forwarding destination comprises an internal network node or another internal network interconnect node.

18. A method of operating a network interconnect node of an internal network, the method comprising:

receiving, at the network interconnect node, frames from an other node of the internal network, the received frames being unencapsulated, the other node being an internal network node or an other internal network interconnect node, the received frames being associated with a service provided by the internal network and/or an external network;

determining, by the network interconnect node, whether the network interconnect node is active or passive for the service associated with the received unencapsulated frames;

forwarding, by the network interconnect node, the unencapsulated frames to an external network interconnect node of the external network when it is determined that the network interconnect node is active for the service associated with the unencapsulated frames; and forwarding, by the network interconnect node, the unencapsulated frames to at least one passive forwarding destination according to a Virtual Local Area Network (VLAN) tagging forwarding process when it is determined that the network interconnect node is passive for the service associated with the unencapsulated frames, wherein the at least one passive forwarding destination comprises an internal network node or another internal network interconnect node;

determining, by the network interconnect node, whether or not the unencapsulated frames should he passively tunneled when it is determined that the network interconnect node is active for the service associated with the unencapsulated frames;

encapsulating, by the network interconnect node, the unencapsulated frames when it is determined that the unencapsulated frames should be passively tunneled when it is determined that the unencapsulated frames should be passively tunneled; and forwarding, by the network interconnect node, the encapsulated frames to at least one internal forwarding destination according to the VLAN tagging forwarding process when it is determined that the unencapsulated frames should be passively tunneled, wherein the at least one internal forwarding destination comprises an internal network node or another internal network interconnect node, and wherein the step of forwarding the unencapsulated frames to the external network interconnect node is performed when it is determined that the uncapsulated frames should not be passively tunneled.

* * * * *